US011769381B2

(12) United States Patent
Ouellette et al.

(10) Patent No.: US 11,769,381 B2
(45) Date of Patent: Sep. 26, 2023

(54) AUTONOMOUS MANAGEMENT AND NOTIFICATION ON BUILDING PATHWAYS

(71) Applicant: JOHNSON CONTROLS TYCO IP HOLDINGS, LLP, Milwaukee, WI (US)

(72) Inventors: Jason Ouellette, Westford, MA (US); James Bauerle, Fishers, IN (US); Allen Houston, Belfast (IE); Peter Lawrence, Lisburn (GB); Kapang Lam, Chelmsford, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/380,929

(22) Filed: Jul. 20, 2021

(65) Prior Publication Data

US 2023/0024877 A1 Jan. 26, 2023

(51) Int. Cl.
| | |
|---|---|
| G08B 7/06 | (2006.01) |
| G08B 21/02 | (2006.01) |
| G06Q 90/00 | (2006.01) |
| G06Q 50/26 | (2012.01) |
| G06Q 40/08 | (2012.01) |
| G05B 15/02 | (2006.01) |
| G06Q 10/20 | (2023.01) |
| G05D 1/02 | (2020.01) |

(52) U.S. Cl.
CPC ............. *G08B 7/066* (2013.01); *G05B 15/02* (2013.01); *G06Q 10/20* (2013.01); *G06Q 40/08* (2013.01); *G06Q 50/26* (2013.01); *G06Q 90/205* (2013.01); *G08B 21/02* (2013.01); *G05D 1/0212* (2013.01)

(58) Field of Classification Search
CPC ........ G08B 7/066; G08B 21/02; G05B 15/02; G06Q 10/20; G06Q 40/08; G06Q 50/26; G06Q 90/205; G05D 1/0212
See application file for complete search history.

(56) References Cited

U.S. PATENT DOCUMENTS

| | | | | |
|---|---|---|---|---|
| 7,081,815 | B2 * | 7/2006 | Runyon | E05G 1/10 340/572.8 |
| 2017/0225321 | A1 * | 8/2017 | Deyle | G06K 7/10297 |
| 2019/0310653 | A1 * | 10/2019 | Lee | G06T 17/05 |
| 2021/0110683 | A1 * | 4/2021 | Guan | G01C 21/3461 |

* cited by examiner

*Primary Examiner* — Quan Zhen Wang
*Assistant Examiner* — Rajsheed O Black-Childress
(74) *Attorney, Agent, or Firm* — ArentFox Schiff LLP

(57) ABSTRACT

Disclosed herein are apparatuses and methods for managing building pathway information. A building and/or security management system can detect, based on receiving input from multiple sensor devices, a possible safety issue in a first pathway to an egress of a building, determine, based on detecting the possible safety issue and based on information regarding other pathways in the building, a second pathway to the egress of the building, and indicate at least the second pathway to another system.

21 Claims, 4 Drawing Sheets

AUTONOMOUS MANAGEMENT AND NOTIFICATION ON BUILDING PATHWAYS

TECHNICAL FIELD

The described aspects relate to building and/or security management systems.

BACKGROUND

Aspects of the present disclosure relate generally to building and/or security management systems, and more particularly, to managing information on pathways in a building.

Building and/or security management systems are currently equipped with some primitive safety devices, such as fire or carbon monoxide detection devices, that can detect and advise on emergency situations occurring within the building. For example, a fire detection device can detect presence of flames within an area of the building and can cause sounding of a fire alarm, reporting a location of the detected fire, and/or the like. An occupant of the building may hear the alarm and/or may receive notification of location of the fire, but may not know a safe pathway for escape or other information about the building that could help to escape or mitigate the emergency situation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a computer-implemented method for managing building pathway information. The method includes detecting, by a building and/or security management system and based on receiving input from multiple sensor devices, a possible safety issue in a first pathway to an egress of a building, determining, based on detecting the possible safety issue and based on information regarding other pathways in the building, a second pathway to the egress of the building, and indicating at least the second pathway to another system.

Another example implementation includes an apparatus for managing building pathway information including a memory, a processor communicatively coupled with the memory and configured to execute a building and/or security management system for detecting, based on receiving input from multiple sensor devices, a possible safety issue in a first pathway to an egress of a building, determining, based on detecting the possible safety issue and based on information regarding other pathways in the building, a second pathway to the egress of the building, and indicating at least the second pathway to another system.

Another example implementation includes a computer-readable medium storing instructions, executable by a processor, for managing building pathway information. The code includes code for detecting, by a building and/or security management system and based on receiving input from multiple sensor devices, a possible safety issue in a first pathway to an egress of a building, determining, based on detecting the possible safety issue and based on information regarding other pathways in the building, a second pathway to the egress of the building, and indicating at least the second pathway to another system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
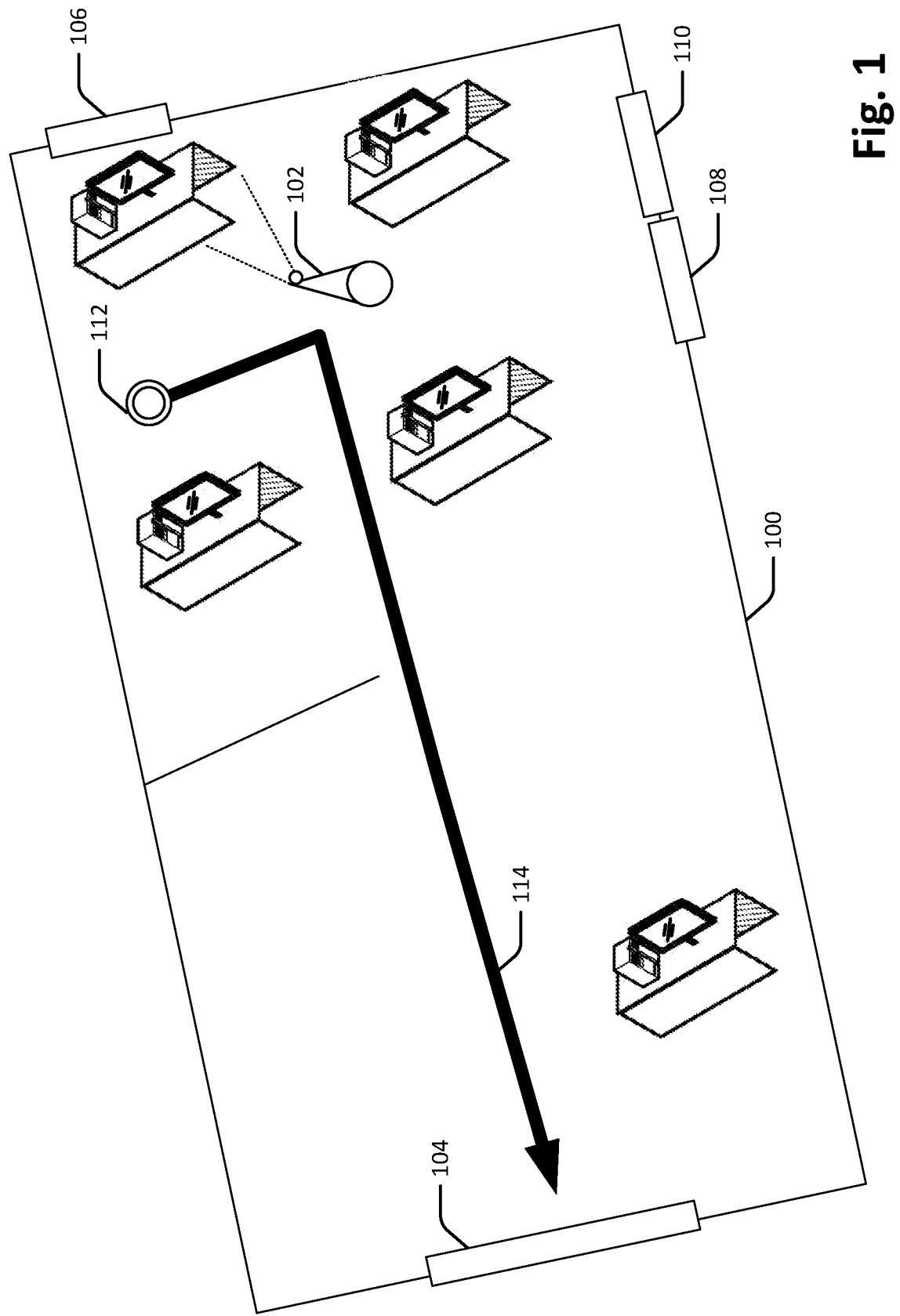
FIG. 1 is a diagram of an example of a building floor for inspection by a robot, in accordance with exemplary aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects described herein relate to a building and/or security management system that can detect or notify on possible safety issues in one or more pathways of the building. For example, the building and/or security management system can receive input from multiple sensors, and may detect the possible safety issues based on the input. The building and/or security management system can also determine or notify on other pathways that may be taken to an egress in view of a possible safety issue. In one aspect, a robot that includes, or can communicate with, the multiple sensors can be configured to travel pathways of the building to detect the possible safety issues, or report information from which possible safety issues can be determined or inferred. For example, the robot can be configured with information related to pathways of the building, or may discover the pathways through exploration. In addition, the robot can be configured with information regarding devices to be monitored within the building, or may discover the devices through exploration. The devices may include safety equipment devices, doors, windows, or other egresses, etc. The robot can check and report status information for safety equipment devices, information regarding accessibility of doors or windows, etc. to the building and/or security management system, and the building and/or security management system can detect possible safety issues based on the information received from the robot, where the possible safety issues can relate to building egress, usage of the safety equipment devices, etc.

In one example, the possible safety issues can correspond to a pathway to an egress being unsafe or unusable. In this example, the building and/or security management system can notify of the unsafe or unusable pathway, can recommend, or provide information for, a different pathway to the egress or another egress to exit the building, and/or the like. In one example, the building and/or security management system can similarly provide information on safe or usable ingress, such as to first responders trying to access the building. In another example, the building and/or security management system can provide information to third-party systems in this regard, such as ingress information to an first responder system, or egress or blockage information to security personnel system or insurance company for proof-of-burden, etc.

In a specific example, the system can use a robot (e.g., which may be a vehicle, drone, etc.) that uses software integration with building management systems and/or physical security system to learn egress and muster pathways to its mapping. The software integration may also provide information about the location and placement of security and safety equipment such as readers, cameras, smoke detectors, fire extinguishers, hoses, sprinklers, etc. Using this information, e.g., along with a library of trained artificial intelligence (AI), the robot can conduct scheduled or manually requested tours of the building to inspect muster paths and security equipment. The robot using the software integration can report, in real time using network protocols, any obstructions, chained or barricaded doors or faulty security/safety equipment such as a discharged fire extinguished or offline reader using AI trained to identify these faults. All tours, inspection, and findings can be recorded historically for audit and reporting.

Aspects described herein provide for collecting and providing the additional contextual information on safe or usable (or unsafe or unusable) egress or ingress to a building can be useful in various scenarios, which can help to maintain safety of occupants in the building, provide information to safely mitigate safety concerns, provide information for determining insurance compliance, etc. In addition, collection and reporting of this information can help to provide duty of care on the clear defining of egress and mustering pathways with the audit and reporting to show maintaining and availability for insurance and law enforcement in response to emergency situations such as fire, active shooter, weather events, etc.

FIG. 1 is a diagram of an example of a building floor 100 for inspection by a robot 102. The building floor 100 can include a doorway 104, doorway 106, and windows 108, 110 as points of ingress and/or egress. A robot 102 can be configured to enter the building floor 100 for inspecting the points of ingress and/or egress (e.g., doorway 104, doorway 106, and windows 108, 110) and/or safety equipment that may be present on the building floor 100 (not shown for ease of explanation). The robot 102 can observe an obstacle (e.g., desk) blocking doorway 106, and can report the blockage to a building and/or security management system. Based on this information, the building and/or security management system can determine to update egress pathways from one or more points on the building floor. For example, the building and/or security management system may have determine a pathway of egress from point 112 through doorway 106.

Based on the robot 102 detecting and reporting the blockage of doorway 106, however, the building and/or security management system can determine the pathway of egress 114 from point 112 through doorway 104.

Based on detecting the blockage or the change in pathway, for example, the building and/or security management system may report information to one or more other systems. For example, the building and/or security management system may report the new pathway of egress to a notification system for notifying one or more building occupants of the change in pathway, the blockage, and/or related information. In another example, the building and/or security management system may report the pathway to a first responder system to inform first responders of a usable ingress into the building floor 100. In yet another example, the building and/or security management system may report the blockage to an insurance system to provide compliance or proof-of-burden information for the building floor 100. The pathways may be defined by the building and/or security management system, which may be based on information received from the robot 102 exploring the building floor 100, manually specified by office personnel, and/or the like.

In some examples, the robot 102 can be a mobile robot or vehicle, drone, etc., having various sensors for detecting potential safety issues, such as status of points of egress, status of safety equipment devices, etc., as described herein. For example, the sensors can include a camera to view the points of egress or safety equipment devices for visual inspection and status determination thereof, or other sensors, such as other readers, smoke detectors, carbon monoxide detectors, etc. In addition, the safety devices to be inspected can include smoke detectors, carbon monoxide detectors, fire extinguishers, hoses, sprinklers, defibrillators, etc. In the examples described herein, the robot 102 can detect potential safety issues in blocked points of egress, functional or non-functional status of the safety equipment devices on the building floor 100, etc., and can report the information to the building and/or security management system for notification, mitigation, etc. of potential safety issues. In examples described herein, the mitigation can include modifying pathways to egress, modifying pathways to functional safety equipment, etc., which can include notification of the modified pathways, to improve safety of building occupants.

Figure 2:
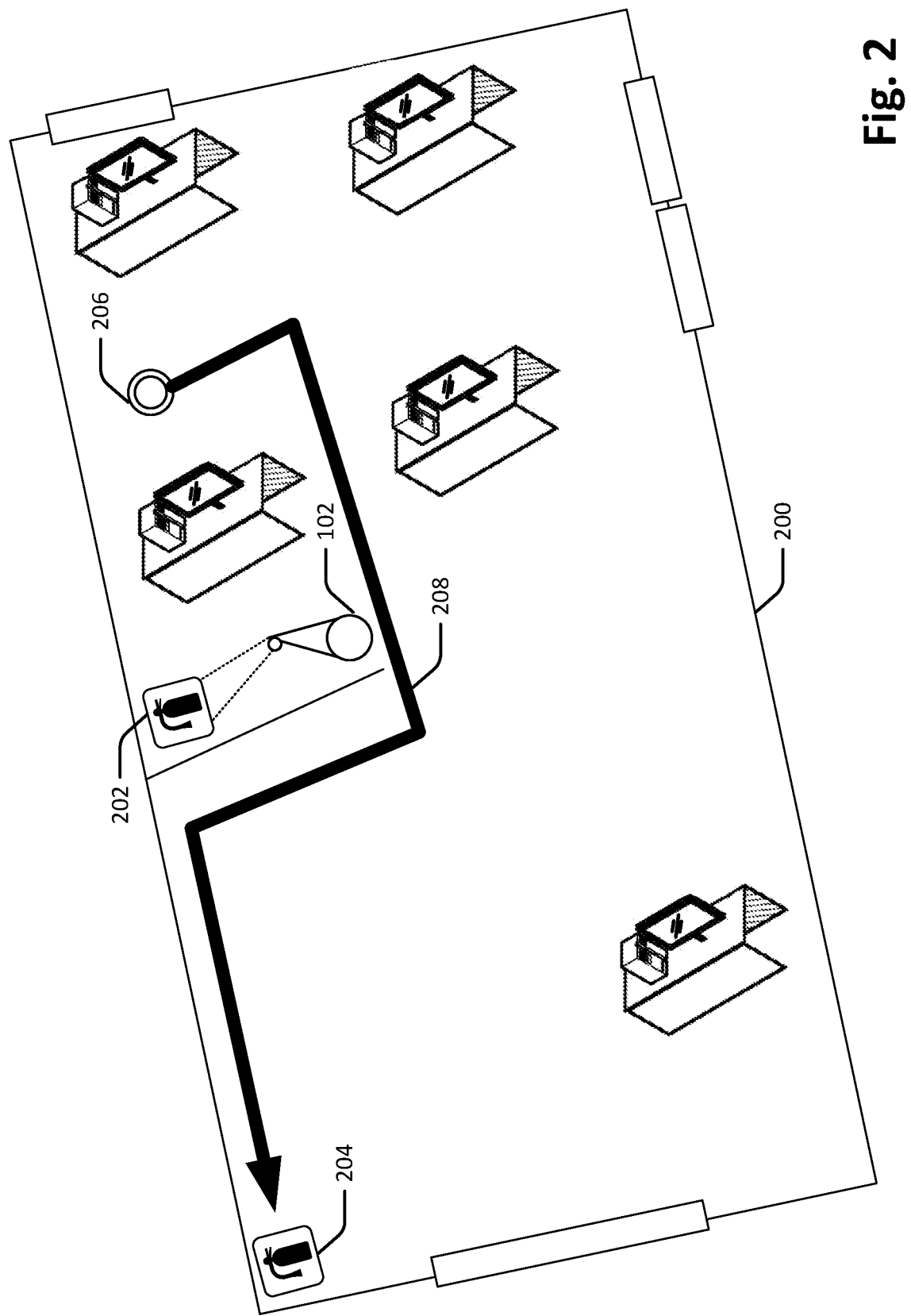
FIG. 2 is a diagram of an example of a building floor with safety equipment devices for inspection by a robot, in accordance with exemplary aspects of the present disclosure.

FIG. 2 is a diagram of an example of a building floor 200 with safety equipment devices for inspection by a robot 102. The building floor 200 can include fire extinguishers 202, 204. A robot 102 can be configured to enter the building floor 200 for inspecting safety equipment devices including fire extinguishers 202, 204, which may be present on the building floor 200. The robot 102 can gather status information for the fire extinguishers 202, 204 using visual inspection (e.g., using a camera to obtain an image of the fire extinguisher, a discharge indicator thereof, etc.), using a reader (e.g., a radio frequency identification (RFID) or other reader) that can communicate with the fire extinguisher to obtain status information thereof, etc., and can report the status information to a building and/or security management system. Based on this information, the building and/or security management system can determine to update pathways from one or more points on the building floor to an operable fire extinguisher.

For example, the building and/or security management system may have determine a pathway to an operable fire extinguisher from point 206 to the closest operating fire extinguisher. In this example, the robot 102 may have reported fire extinguisher 202 being inoperable or having a certain discharge status (or not being present), in which case the building and/or security management system can modify a pathway from point 206 to be pathway 208 to fire extinguisher 204. Based on detecting the fire extinguisher 202 with inoperable status or the change in pathway, for example, the building and/or security management system may report information to one or more other systems, as described above and further herein.

Figure 3:
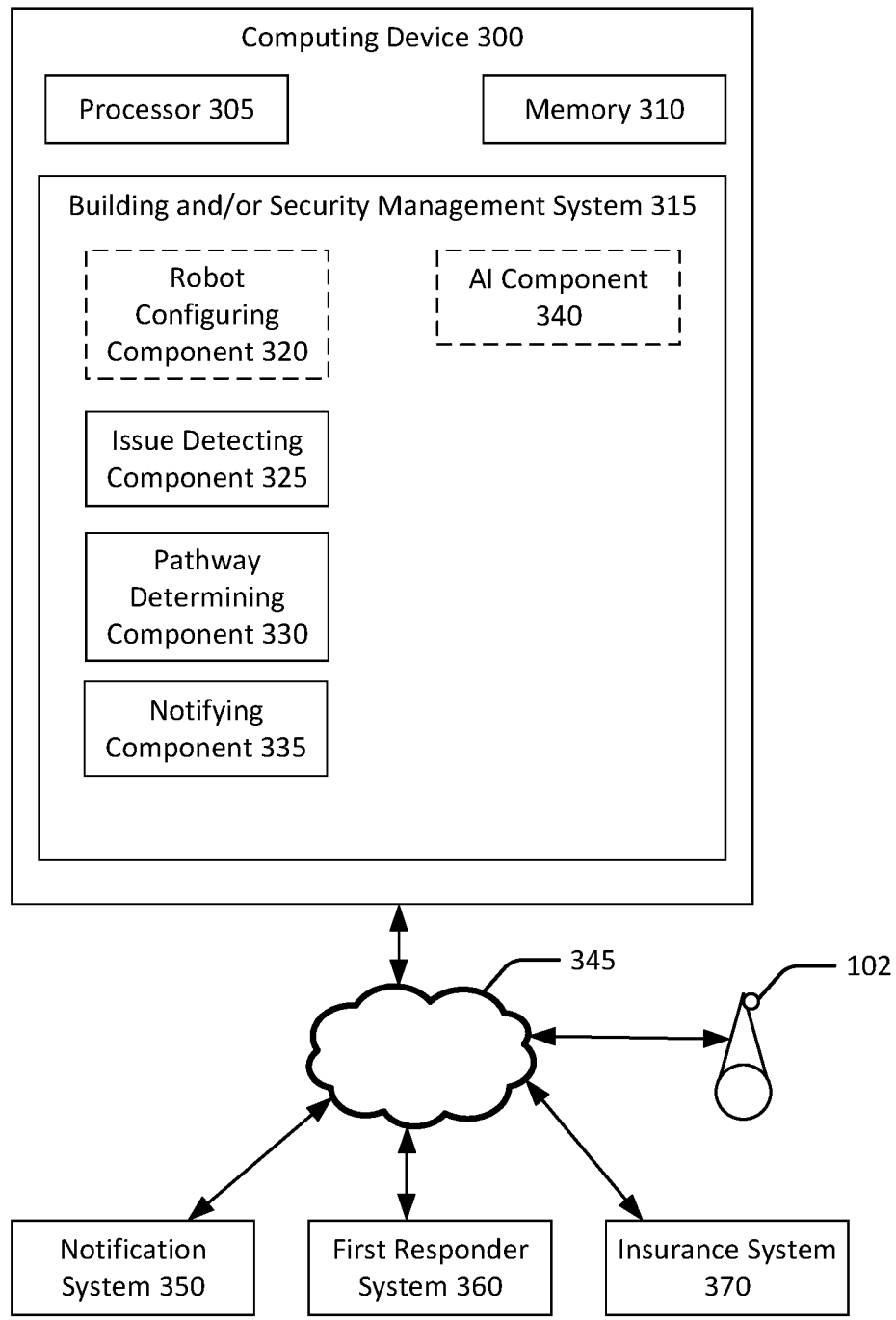
FIG. 3 is a block diagram of computing device for executing a building and/or security management system that provides pathway information for a building, in accordance with exemplary aspects of the present disclosure.

FIG. 3 is a block diagram of computing device 300 for executing a building and/or security management system 315 that provides pathway information for a building. Computing device 300 can include a processor 305 (and/or multiple processors) and/or a memory 310 configured to execute or store instructions or other parameters related to performing one or more processes, executing the building and/or security management system 315, etc. For example, processor 305 and memory 310 may be separate components communicatively coupled by a bus (e.g., on a motherboard or other portion of a computing device, on an integrated circuit, such as a system on a chip (SoC), etc.), components integrated within one another (e.g., processor 305 can include the memory 310 as an on-board component), and/or the like. Memory 310 may store instructions, parameters, data structures, etc. for use/execution by processor 305 to perform functions described herein.

In an example, the building and/or security management system 315 can optionally include a robot configuring component 320 for configuring a robot 102 to tour a building for obtaining information regarding devices in the building, which may include safety equipment devices, doors, windows, or other points of egress or ingress, etc. In another example, building and/or security management system 315 may optionally include one or more of an issue detecting component 325 for detecting a possible safety issue based on information received from the robot 102, one or more sensors on the robot 102, or one or more other sensors located in the building, a pathway determining component 330 for determining or indicating pathways in the building where the pathways may be between a location in the building and a point of egress or ingress, or a notifying component 335 that can notify personnel or other systems of a pathway modification or possible safety issue that may result in a pathway modification, etc. In another example, building and/or security management system 315 may optionally include an AI component 340 for using AI in determining whether a possible safety issue exists and/or a modification to a pathway in view of the possible safety issue.

For example, computing device 300 can communicate with one or more other devices or systems via a network 345. For example, computing device 300 can communicate with the robot 102 to configure the robot 102 for touring the building and/or verifying or reporting status information of one or more devices in the building. In another example, computing device 300 can communicate with a notification system 350 to notify personnel or other systems of pathway modifications, possible safety issues detected based on information received from the robot 102, etc. In another example, computing device 300 can communicate with a first responder system 360 to notify first responders of pathways for ingress into a building in view of possible safety issues based on information received from the robot 102, etc. In yet another example, computing device 300 can communicate with an insurance system 370 to notify insurance personnel or other systems of possible safety issues detected based on information received from the robot 102, etc. for proof-of-burden.

Figure 4:
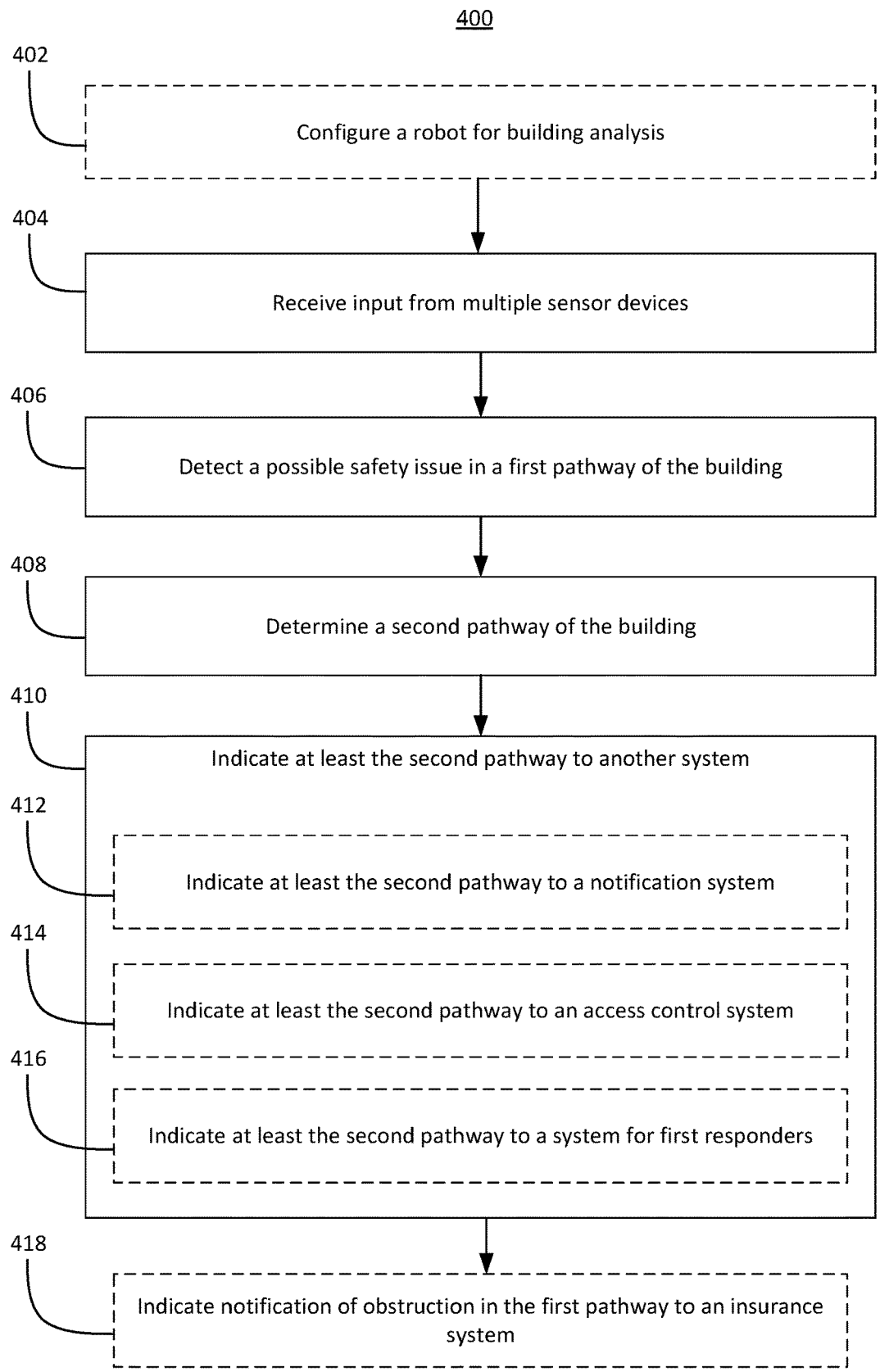
FIG. 4 is a flowchart of an example of a method for modifying a pathway in a building based on detecting possible safety issues within a pathway, in accordance with exemplary aspects of the present disclosure.

FIG. 4 is a flowchart of an example of a method 400 for modifying a pathway in a building based on detecting possible safety issues within a pathway. For example, method 400 can be performed by a computing device 300 and/or one or more systems or components thereof to facilitate pathway modification, safety issue detection, etc.

At block 402, method 400 can optionally include configuring a robot for building analysis. In an aspect, robot configuring component 320, e.g., in conjunction with computing device 300, processor 305, memory 310, building and/or security management system 315, etc., can configure the robot (e.g., robot 102) for building analysis, such as to analyze one or more devices on a building or a portion of the building (e.g., a building floor 100, 200 or portion thereof). In an example, robot configuring component 320 can configure the robot 102 with location information regarding the one or more devices, a type of the one or more devices, status information to be reported for the one or more devices. In another example, the robot 102 can detect the location of one or more devices based on visual inspection when traveling the building. In another example, robot configuring component 320 can configure the robot 102 with location information for areas to be inspected, and robot 102 can detect the one or more devices in the areas.

In an example, robot configuring component 320 can configure the robot 102 to periodically inspect the one or more devices based on specifying properties of the one or more devices to be inspected. In an example, the robot 102 may include multiple sensor devices for detecting the status of one or more devices, such as a camera for visual inspection. For example, robot configuring component 320 can configure the robot 102 to inspect doorways and/or corresponding doors to ensure the doors are accessible. In an example, robot configuring component 320 can configure the robot 102 to detect possible object obstruction in front of the door at a specified location of the door. In another example, robot configuring component 320 can configure the robot 102 to detect a chain or other lock or barricade on one or more sides of the door that may prevent egress out of, or ingress into, the door.

In another example, robot configuring component 320 can configure the robot 102 to inspect fire extinguishers, or related locations, to ensure the fire extinguishers are present, to check a charge of the fire extinguisher via visual inspection using the camera of the robot 102 or a reader (e.g., a RFID or other reader) that can communicate with the fire extinguisher to obtain charge level information. For example, checking the charge via visual inspection can include obtaining an image of a charge indicator for the fire extinguisher via the camera of the robot 102, and comparing the image to images of varying level of charge (e.g., using a neural network of images or otherwise) to determine the charge status of the fire extinguisher. In another example, checking the charge via visual inspection can include obtaining an image of a charge indicator for the fire extinguisher via the camera of the robot 102 and performing analysis of the image to determine where a certain color of a charge indicator (e.g., yellow) lies within another color of the background indicating the charge level (e.g., in a red or green zone) to determine the charge status of the fire extinguisher.

In other examples, robot configuring component 320 can similarly configure the robot 102 to inspect various other devices, such as smoke detectors (e.g., a light emitting diode (LED) or RFID-read status on the smoke detector), hoses, sprinklers, security cameras (e.g., to ensure the cameras are on-line via LED indicator, in-focus, etc.) and/or the like. In other examples, robot configuring component 320 can configure the robot 102 to take pictures at certain locations, and AI component 340 can determine the relevant status information of the devices (e.g., as described in the above examples). The robot configuring component 320 can also configure the robot 102 to report other information related to the status information, such as a location or identifier of the device that can allow the building and/or security management system 315 to determine a location of a possible safety issue.

At block 404, method 400 can include receiving input from multiple sensor devices. In an aspect, issue detecting component 325, e.g., in conjunction with computing device 300, processor 305, memory 310, building and/or security management system 315, etc., can receive input from multiple sensor devices. For example, the multiple sensor devices can include one or more sensors on the robot 102 or other sensors positioned throughout the building to provide status information for one or more devices in the building. As described, the one or more devices can include safety equipment devices, doors, windows, etc., and issue detecting component 325 can receive the status information from the robot 102 periodically traveling the building and reporting findings related to one or more of the devices (e.g., images of the devices, determinations of status information for the devices, etc.). In another example, issue detecting component 325 can receive the status information from other systems that monitor and control the devices, such as an access control system that manages access to doors, a fire safety system that manages smoke detectors and sprinklers, a security system that manages cameras that provide view of areas of the building, etc.

At block 406, method 400 can include detecting a possible safety issue in a first pathway of the building. In an aspect, issue detecting component 325, e.g., in conjunction with computing device 300, processor 305, memory 310, building and/or security management system 315, etc., can detect the possible safety issue in the first pathway of the building. For example, issue detecting component 325 can receive the input from the multiple sensor devices and can detect the possible safety issue by analyzing the input from the multiple sensor devices. For example, issue detecting component 325 can communicate the input from the multiple sensor devices to AI component 340 for a determination on whether a possible safety issue exists. As described, for example, AI component 340 can compare inputs from the multiple sensor devices to data in a neural network to determine whether the possible safety issue exists, a likelihood that the possible safety issue exists, a severity of the possible safety issue, etc. In addition, for example, issue detecting component 325 can determine a location within the building or portion thereof (e.g., building floor 100, 200) of the possible safety issue, which can be determined based on an identifier of a device received from the robot 102 analyzing the device, location information received from the robot 102 reporting sensor input related to the device, a known location of other sensors from which the sensor input is received, etc.

In an example, based on the location of the possible safety issue, issue detecting component 325 can determine the location as within a first pathway to an egress (or ingress) of the building. For example, building and/or security management system 315 can define or can be configured with multiple pathways in the building that can indicate a pathway from a building location to a point of egress or ingress. In one example, an administrator or security personnel can define the pathways in the building and/or security management system. In another example, robot configuring component 320 can configure the robot 102 to determine the pathways when exploring the building. The pathways can relate to pathways for safe egress from the building in the case of emergency (e.g., fire, active shooter, weather events, etc.). The pathways can be configured to include multiple location points that define the pathways, and building and/or security management system 315 can determine when a possible safety issues falls within a pathway based on comparing a location of the possible safety issue with locations in the pathway to determine whether the pathway includes the location or a nearby location.

In another example, where the possible safety issue relates to a safety equipment device, issue detecting component 325 can determine the location as a location of the safety equipment device. For example, the first pathway having the possible safety issue can be the pathway from the current location to the safety equipment device (e.g., a first extinguisher).

At block 408, method 400 can include determining a second pathway to the egress of the building. In an aspect, pathway determining component 330, e.g., in conjunction with computing device 300, processor 305, memory 310, building and/or security management system 315, etc., can determine the second pathway to the egress (or ingress) of the building. For example, based on detecting the possible safety issue in the first pathway, pathway determining component 330 can determine the second pathway as a pathway having a same starting location as the first pathway, but a different point of egress, or a different pathway to the point of egress. For example, in determining the second pathway, pathway determining component 330 can also determine that the second pathway does not have a possible safety issue (or has a possible safety issue that is of a lower severity level than the possible safety issue in the first pathway). In one example, building and/or security management system 315 can store multiple pathways from a location to an egress, and can rank or select a current pathway for a given location. In this example, where issue detecting component 325 detects the possible issue in a ranked or current pathway, pathway determining component 330 can rank the second pathway above the first pathway and/or can select the second pathway as the current pathway for the location.

In another example, where the possible safety issue relates to a safety equipment device, pathway determining component 330 can determine the second pathway as a pathway from the current location to another location that has a properly functioning safety equipment device. For example, the first pathway having the possible safety issue can be the pathway from the current location to the safety equipment device (e.g., a first extinguisher), and the pathway determining component 330 can update a pathway from the currently location to the safety equipment device to lead to a different safety equipment device that is properly functioning.

At block 410, method 400 can include indicating at least the second pathway to another system. In an aspect, notifying component 335, e.g., in conjunction with computing device 300, processor 305, memory 310, building and/or security management system 315, etc., can indicate at least the second pathway to another system. For example, in this regard, notifying component 335 can notify of the second pathway and/or of the possible safety issue in the first pathway.

In indicating at least the second pathway at block 410, optionally at block 412, at least the second pathway can be indicated to a notification system. In an aspect, notifying component 335, e.g., in conjunction with computing device 300, processor 305, memory 310, building and/or security management system 315, etc., can indicate at least the second pathway to the notification system 350. For example, notifying component 335 can indicate the second pathway to a notification system 350, and the notification system 350 can alert building occupants, security personnel, etc. of the second pathway or the possible safety issue. In an example, notifying component 335 can notify of the second pathway as part of detecting the possible safety issue in the first pathway or modifying to the second pathway. In another example, notifying component 335 can notify of the second pathway based on a request from a building occupant for a safe/accessible egress to the building.

In another example, notifying component 335 can notify of the second pathway based on a request from a building occupant to access a safety equipment device. For example, where issue detecting component 325 detects a possible safety issue related to a discharged or malfunctioning fire extinguisher, pathway determining component 330 can determine the second pathway as a pathway to another fire extinguisher that is functioning, as described.

In indicating at least the second pathway at block 410, optionally at block 414, at least the second pathway can be indicated to an access control system. In an aspect, notifying component 335, e.g., in conjunction with computing device 300, processor 305, memory 310, building and/or security management system 315, etc., can indicate at least the second pathway to an access control system, which may be part of the building and/or security management system 315. In this example, the access control system can perform certain functions based on the second pathway to enable occupants to access the second pathway, and/or prevent occupants from accessing the first pathway, such to protect the occupants from the possible safety issue. In this regard, for example, the access control system can lock/unlock or close/open doors or windows in the building to enable access via the second pathway or prevent access via the first pathway, etc.

In indicating at least the second pathway at block 410, optionally at block 416, at least the second pathway can be indicated to a system for first responders. In an aspect, notifying component 335, e.g., in conjunction with computing device 300, processor 305, memory 310, building and/or security management system 315, etc., can indicate at least the second pathway to a system for first responders (e.g., first responder system 360). For example, notifying component 335 can indicate at least the second pathway as a safe or available pathway of ingress to the building in the event of an emergency. For example, as part of the emergency, issue detecting component 325 may detect the possible safety issue as a fire, active shooter, etc. from obtained sensor data. Notifying component 335 can, based on detecting the emergency or based on a query from the first responder system, indicate the second pathway to the location of the building to allow first responders to safely enter the building and mitigate the safety issue to the building occupants. For example, notifying component 335 can notify the first responder system 360 upon detection/determination of the possible safety issue, upon request from the first responder system 360 in responding to an emergency, etc.

At block 418, method 400 can optionally include indicating notification of obstruction in the first pathway to an insurance system. In an aspect, notifying component 335, e.g., in conjunction with computing device 300, processor 305, memory 310, building and/or security management system 315, etc., can indicate at least the second pathway to the insurance system (e.g., insurance system 370). This can allow the insurance system 370 to modify premiums, verify proof-of-burden, notify insurance agents of the possible safety issues, etc. For example, notifying component 335 can notify the insurance system 370 upon detection/determination of the possible safety issue, periodically in a report of possible safety issues, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage de-vices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated other-wise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for managing building pathway information, comprising:
    detecting, by a building and/or security management system and based on receiving input from multiple sensor devices, a possible safety issue related to function of a first safety equipment device in a first pathway to an egress of a building;
    determining, by the building and/or security management system and based on detecting the possible safety issue and based on information regarding other pathways in the building, a second pathway to the egress, or a different egress, of the building, wherein determining the second pathway to the egress or the different egress is based on determining, by the building and/or security management system, that the second pathway has a second safety equipment device without the possible safety issue; and
    indicating at least the second pathway to another system.

2. The computer-implemented method of claim 1, wherein the multiple sensor devices include at least one sensor device on a robot, wherein the robot is configured to tour the building and report information recorded from the at least one sensor device.

3. The computer-implemented method of claim 2, further comprising receiving, from the robot, the information regarding the first pathway, the second pathway, and one or more other pathways to the egress.

4. The computer-implemented method of claim 2,
    wherein the robot is configured to detect one or more devices in the building, including the first safety equipment device, record status information for the one or more devices, and report the status information of the one or more devices, and
    wherein detecting the possible safety issue is based at least in part on the status information of the one or more devices and determining that the one or more devices are in the first pathway.

5. The computer-implemented method of claim 4, further comprising providing, to the robot, location information regarding the one or more devices, wherein the robot is configured to travel to the one or more devices to detect or inspect the one or more devices.

6. The computer-implemented method of claim 4, wherein the one or more devices include a door or window.

7. The computer-implemented method of claim 1, wherein the first safety equipment device and the second safety equipment device include fire extinguishers, and wherein the possible safety issue relates to a discharge state of the fire extinguishers.

8. The computer-implemented method of claim 1, further comprising modifying, by the building and/or security management system, access to at least a portion of the first pathway based on the possible safety issue.

9. The computer-implemented method of claim 1, wherein indicating at least the second pathway includes notifying, by the building and/or security management system, first responders of at least the second pathway.

10. The computer-implemented method of claim 1, further comprising notifying an insurance system of the possible safety issue.

11. The computer-implemented method of claim 1, wherein determining the second pathway includes determining the second pathway to the different egress.

12. An apparatus for managing building pathway information, comprising:
    a memory;
    a processor communicatively coupled with the memory and configured to execute a building and/or security management system for:
        detecting, based on receiving input from multiple sensor devices, a possible safety issue related to function of a first safety equipment device in a first pathway to an egress of a building;
        determining, based on detecting the possible safety issue and based on information regarding other pathways in the building, a second pathway to the egress, or a different egress, of the building, wherein determining the second pathway to the egress or the different egress is based on determining, by the building and/or security management system, that the second pathway has a second safety equipment device without the possible safety issue; and
        indicating at least the second pathway to another system.

13. The apparatus of claim 12, wherein the multiple sensor devices include at least one sensor device on a robot, wherein the robot is configured to tour the building and report information recorded from the at least one sensor device.

14. The apparatus of claim 13, wherein the processor is further configured to execute the building and/or security management system for receiving, from the robot, the information regarding the first pathway, the second pathway, and one or more other pathways to the egress.

15. The apparatus of claim 13,
    wherein the robot is configured to detect one or more devices in the building, including the first safety equipment device, record status information for the one or more devices, and report the status information of the one or more devices, and
    wherein the processor is configured to execute the building and/or security management system for detecting the possible safety issue based at least in part on the status information of the one or more devices and determining that the one or more devices are in the first pathway.

16. The apparatus of claim 15, wherein the processor is further configured to execute the building and/or security management system for providing, to the robot, location information regarding the one or more devices, wherein the robot is configured to travel to the one or more devices to detect or inspect the one or more devices.

17. The apparatus of claim 15, wherein the one or more devices include a door, or a window.

18. The apparatus of claim 12, wherein the processor is further configured to execute the building and/or security management system for modifying access to at least a portion of the first pathway based on the possible safety issue.

19. A non-transitory computer-readable medium storing instructions, executable by a processor, for managing building pathway information, the code comprising code for:
    detecting, by a building and/or security management system and based on receiving input from multiple sensor devices, a possible safety issue related to function of a first safety equipment device in a first pathway to an egress of a building;
    determining, by the building and/or security management system and based on detecting the possible safety issue and based on information regarding other pathways in the building, a second pathway to the egress, or a different egress, of the building, wherein determining the second pathway to the egress or the different egress is based on determining, by the building and/or security management system, that the second pathway has a second safety equipment device without the possible safety issue; and indicating at least the second pathway to another system.

20. The non-transitory computer-readable medium of claim 19, wherein the multiple sensor devices include at least one sensor device on a robot, wherein the robot is configured to tour the building and report information recorded from the at least one sensor device.

21. The non-transitory computer-readable medium of claim 20, further comprising code for receiving, from the robot, the information regarding the first pathway, the second pathway, or one or more other pathways to the egress.

\* \* \* \* \*